Dec. 21, 1937.    L. W. HOWLE    2,102,708
SIGNAL TESTING APPARATUS
Filed Dec. 28, 1936    2 Sheets—Sheet 1

INVENTOR
L. W. HOWLE
BY
ATTORNEY

Dec. 21, 1937.  L. W. HOWLE  2,102,708
SIGNAL TESTING APPARATUS
Filed Dec. 28, 1936   2 Sheets-Sheet 2

INVENTOR
L. W. HOWLE
BY
ATTORNEY

Patented Dec. 21, 1937

2,102,708

UNITED STATES PATENT OFFICE 2,102,708

SIGNAL TESTING APPARATUS

Louis W. Howle, Atlanta, Ga., assignor to American Telephone and Telegraph Company, a corporation of New York Application December 28, 1936, Serial No. 117,935

3 Claims. (Cl. 178—69)

This invention relates broadly to the art of electric signaling and particularly to methods and apparatus by which telegraph signals may be tested.

The object of this invention is a method of and an apparatus for determining the effect of a transmission line upon an electric impulse transmitted therethrough.

A feature of the invention is a means for comparing a series of received signals.

Another feature is a means for determining the margin between telegraph signals.

In its preferred form the method consists in translating telegraphic impulses into a beam of light modulated in accordance therewith, and recording the modulated beam upon a photosensitive paper in the form of a spiral, the generation of which is synchronized with the impulses so that each signal is made to start from a predetermined radius. The duration of each impulse and the time of its occurrence with respect to the theoretical starting time can then be readily determined by means of a protractor and a straight edge.

The apparatus may take the form of a relay-operated shutter interposed between a source of light and a rotating light sensitive disc. The disc is preferably rotated by a motor synchronized with the sending apparatus, and the relay operating the shutter may be connected to the signal receiving end of the line. Suitable motor driven means is provided to move the disc laterally so that spiral trace may be generated by the light beam.

The preferred form of the invention is shown in the accompanying drawings which form a part of this specification and in which.

Figure 1:
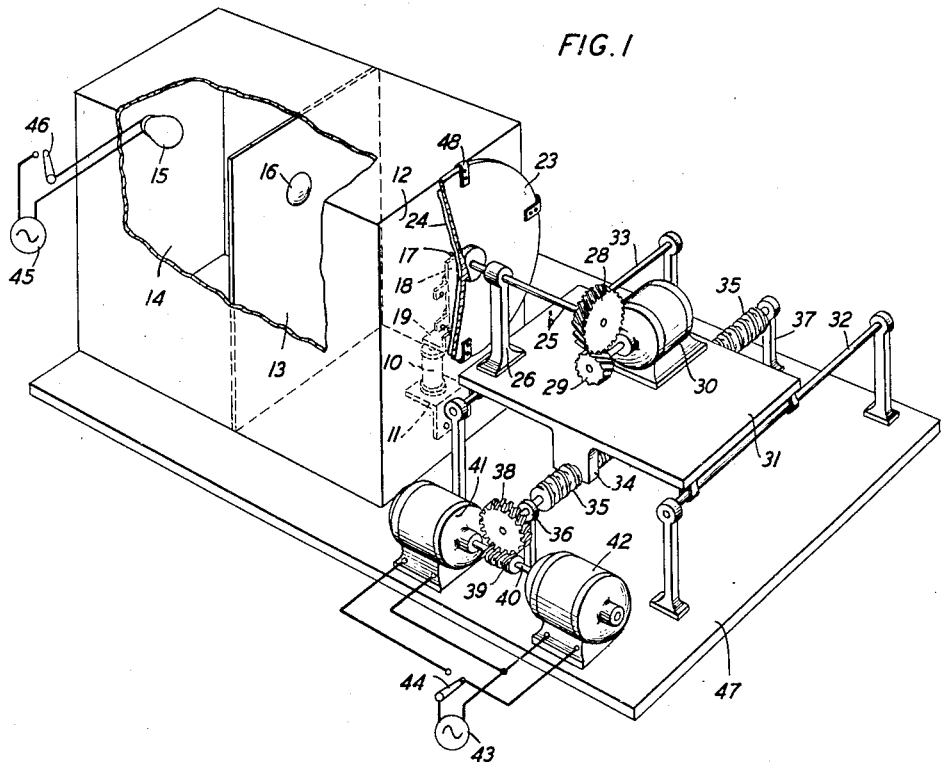
Figure 1 is a perspective of the testing device.
Figure 2:
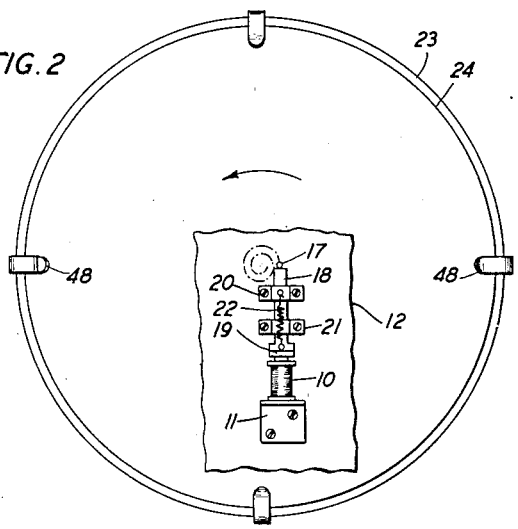
Fig. 2 is an elevation showing the relay operated shutter and the disc.

Referring more particularly now to Figs. 1 and 2, 10 is a relay which is connected to the receiving end of a telegraph line. It is supported by means of a bracket 11, or other suitable support, secured to a wall 12 of a dark chamber 13. In an adjacent chamber 14 is a source of light 15 the radiation from which is transmitted to chamber 13 through a lens 16. Opposite lens 16 in wall 12 is a small aperture 17 and a shutter 18 secured to armature 19 which cooperates with receiving relay 10. Guides 20 and 21 are provided for shutter 18, and a spring 22 returns shutter 18 to its closed position when armature 19 is not attracted by relay 10. As shown in Fig. 2 shutter 18 is in its operated position, that is, it is shown in the position it assumes when relay 10 receives a signal impulse.

In the path of the light beam is a rigid disc 23 upon which is mounted a light sensitive disc 24. Disc 23 is mounted on shaft 25, which is supported by journaled standard 26 and driven through gears 28 and 29 by a synchronous motor 30. A motion of rotation is thus imparted to disc 23 by motor 30. Standard 26 and motor 30 are mounted on a carriage 31 which is adapted to slide on ways 32 and 33. Carriage 31 is provided with a depending lug 34 shaped and threaded to form a half-nut, which cooperates with lead screw 35 supported parallel to ways 32 and 33 between journaled standards 36 and 37. At one end of lead screw 35 is a worm-wheel 38 cooperating with a worm 39 mounted on a shaft 40 common to motors 41 and 42. Motor 42 is used when it is desired to generate the spiral, that is, (Fig. 2) when it is desired to move the disc from right to left with respect to aperture 17. Motor 41 is used to return disc 23 to its starting position. A suitable source of power 43 and a switch 44 are used to effect and control the operation of motors 41 and 42. Other means, such as reversible gears or clutches, may be used in place of motor 41 to return disc 23. In a similar manner a suitable source of electromotive force 45 and a switch 46 are used to control the operation of lamp 15. The entire apparatus may be mounted on a base 47 for easy portability.

Light sensitive disc 24 is held on supporting disc 23 by means of clips 48 placed around the periphery of disc 23. For greater ease in inserting and removing light sensitive discs, carriage 31 is made pivotable about way 32. Under ordinary circumstances, however, the insertion and removal of a light sensitive disc can be effected by simply raising one of the clips 48 and then sliding disc 24 along the face of disc 23.

To operate the test apparatus, an unexposed light sensitive disc 24 is placed upon supporting disc 23, lamp 15 is switched on by means of switch 46, driving motor 42 is started to move carriage 31 laterally along ways 32 and 33 and the signal to be tested is impressed upon relay 10. Simultaneously with the operation of relay 10, motor 30 is started and operated in synchronism with the transmitting mechanism. When disc 24 has been completely traversed by the light beam, or, if desired, at some earlier stage, motor 42 is stopped, and light sensitive disc 24 is moved from supporting disc 23 and developed to form a permanent record. If additional records are desired, an unexposed disc is again placed upon supporting disc 23, motor 41 is operated to return carriage 31 to the starting position, and the cycle of operations just described is repeated.

Figure 3:
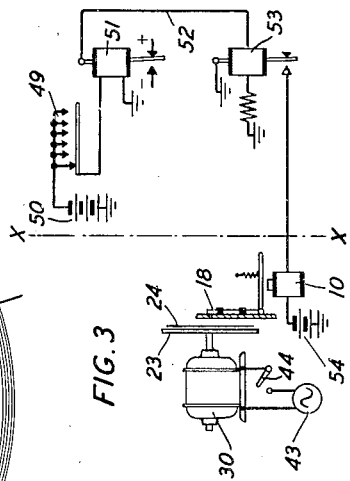
Fig. 3 is a schematic wiring diagram of a sending relay, receiving relay and a test apparatus in which there is substantially no impedance between the sending and receiving relays.

A schematic wiring diagram for the test apparatus and signaling system is shown in Fig. 3. A cam-operated circuit interrupter 49 makes and breaks, at predetermined intervals, a circuit from ground, through battery 50 and sending relay 51 back to ground. Sending relay 51 puts alternately positive and negative potential upon line 52 to which receiving relay 53 is connected. The operation of relay 53 causes ground to be connected to one side of relay 10 and completes the circuit therethrough to battery 54 and ground. The consequent energization of relay 10 withdraws shutter 18 and permits light to pass through aperture 17 in wall 12 and strike light sensitive disc 24.

Figure 4:
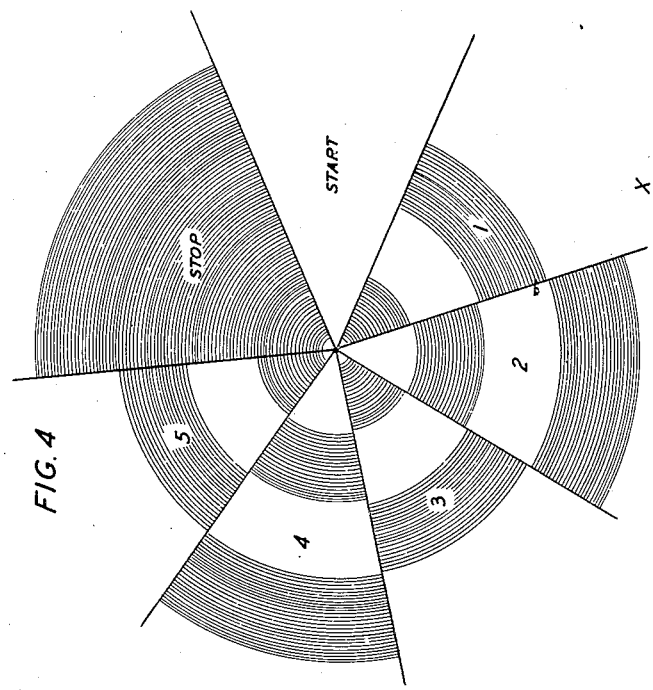
Fig. 4 is a facsimile of a trace produced by the circuit and apparatus of Fig. 3.

The type of record made with the circuit of Fig. 3 is shown in Fig. 4. Since the speed of rotation of disc 24 is kept constant and in synchronism with the cam-operated circuit interrupter, the angular displacement for any given signal is the same irrespective of the distance of the trace from the center. A signal which is repeated therefore appears as a sector or a sector of an annulus. The duration of a signal can be determined from the angle subtended by the trace and the speed of rotation of the disc. The starting time of a received signal can be compared with the starting time of the signal at the sending station by noting whether the trace begins at the proper radial line. Since there is practically no impedance in the transmission line shown in Fig. 3, the signal is transmitted substantially unchanged and undelayed. The corresponding traces in Fig. 4 are therefore clear-cut and of uniform duration.

Figure 5:
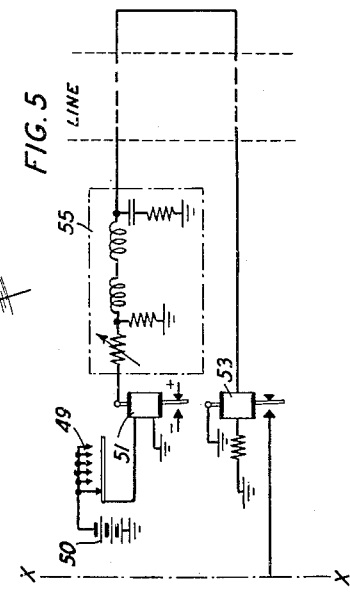
Fig. 5 is a schematic wiring diagram in which an impedance is inserted between the sending and receiving relays; and, Fig. 6 is a facsimile of a trace produced by the circuit shown in Fig. 5.

Fig. 5 shows a circuit which resembles an actual installation. In it are included various loading and other impedances 55 of an inductive and capacitive character which introduce a certain amount of distortion. This distortion is evidenced in the trace of Fig. 6 as non-uniform segments. Thus a radial line cannot be drawn connecting the ends of all of the segments in a group, which indicates that the signal was not transmitted uniformly at successive times and was therefore subjected to distorting influences.

Figure 6:
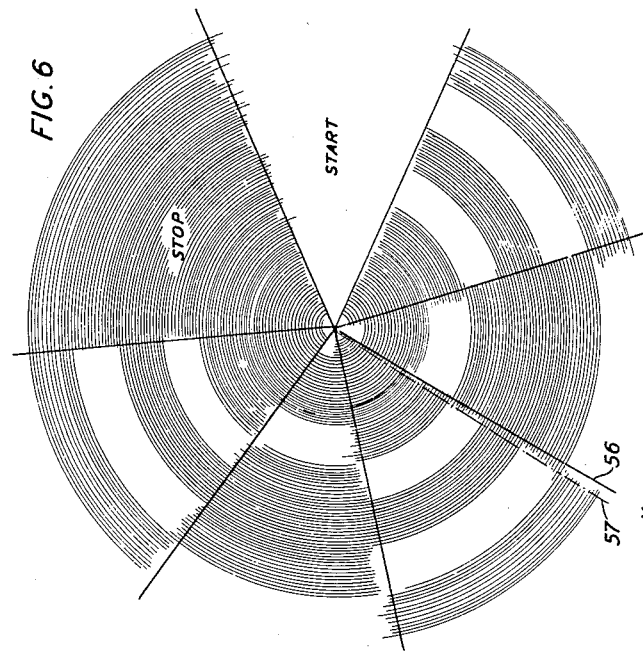

The principal advantage of the type of test apparatus just described over other types is in the ease with which the segments of a trace may be expressed as functions of time. For example, assume that a signal is sent at the instant of time represented by radius 56 (Fig. 6). If there is no distortion, a segment will be begun at this point and will continue until the impulse disappears. If distortion is introduced, however, the segment will not be begun until some later time as at 57, that is, there will be a margin between the sending and receiving of the signal. This margin can be expressed in time units by measuring the angle between radii 56 and 57 and then determining the fractional part of 360 degrees represented by this angle. Knowing the speed of rotation of the disc, it is a simple matter to determine the time required to generate this angle.

Another advantage is the great economy in space effected by this method of recording the signals. Quite a large number of signals can be recorded in a relatively small amount of space, since the trace near the center of the disc can be made small without impairing its definition.

It is understood that the apparatus above described is merely illustrative of one embodiment of the invention and that the scope of the invention is not to be limited thereto but is to be determined by the appended claims.

What is claimed is:

1. Apparatus for testing telegraph signals which comprises a signal producing means, a signal receiving means, a light beam, a photosensitive member in the path of the light beam, a shutter operated by the signal receiving means and adapted to interrupt said light beam in accordance with the received signals, means synchronized with the signal producing means for rotating said light sensitive member, and means for simultaneously imparting a transverse motion to said light sensitive member whereby a discontinuous spiral trace is formed upon said light sensitive member, the position of the discontinuities being an indication of the condition of the received signal.

2. Apparatus for measuring distortion in telegraph signals comprising means for recording said signals as spiral traces and means for starting the recording of the signals upon common radii, whereby deviations from a true reproduction of the signals are manifested as angular displacements of the trace from the starting radii.

3. Apparatus for testing telegraph signals comprising a transmitter, a receiving relay, a light beam, a photosensitive disc in the path of the light beam, a shutter operated by the relay and adapted to interrupt the light beam in accordance with the received signals, a motor synchronized with the transmitter for driving the disc, and a lead screw for imparting a transverse motion to the disc whereby signals are recorded as a discontinuous spiral, the relative positions of the discontinuities being an indication of the condition of the received signal.

LOUIS W. HOWLE.